No. 680,976. Patented Aug. 20, 1901.
A. L. HOCKETT.
COTTON CHOPPER.
(Application filed Dec. 14, 1899.)
(No Model.) 2 Sheets—Sheet 1.
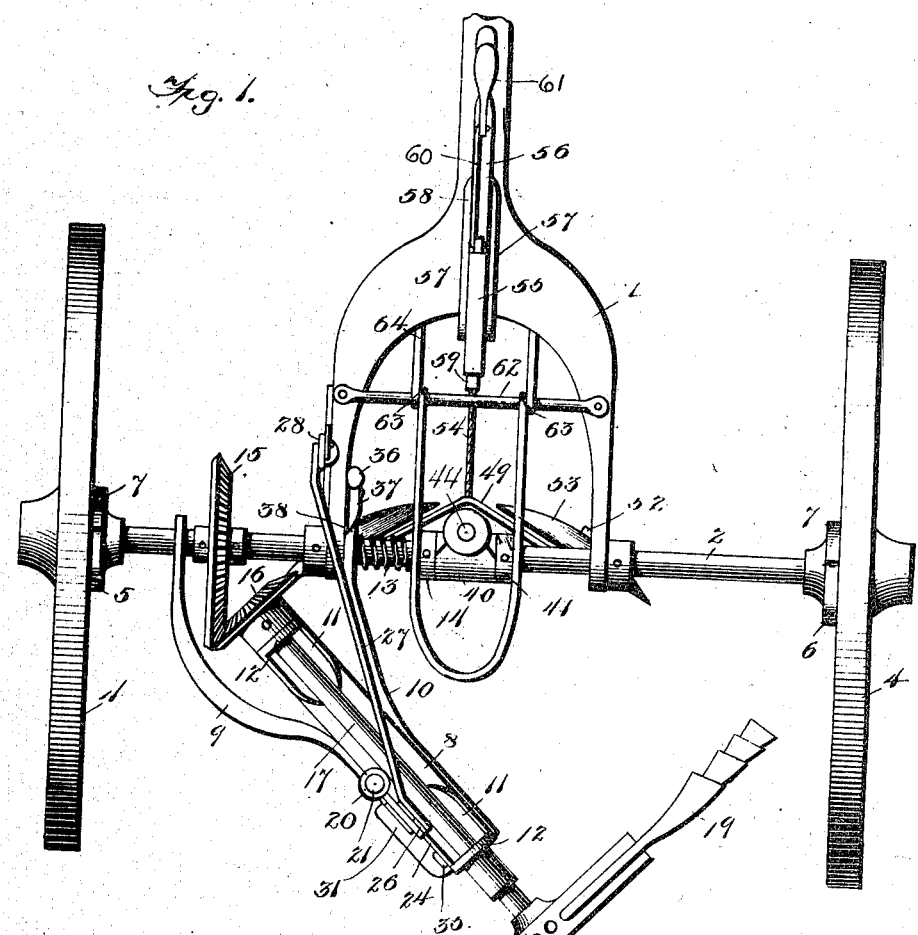
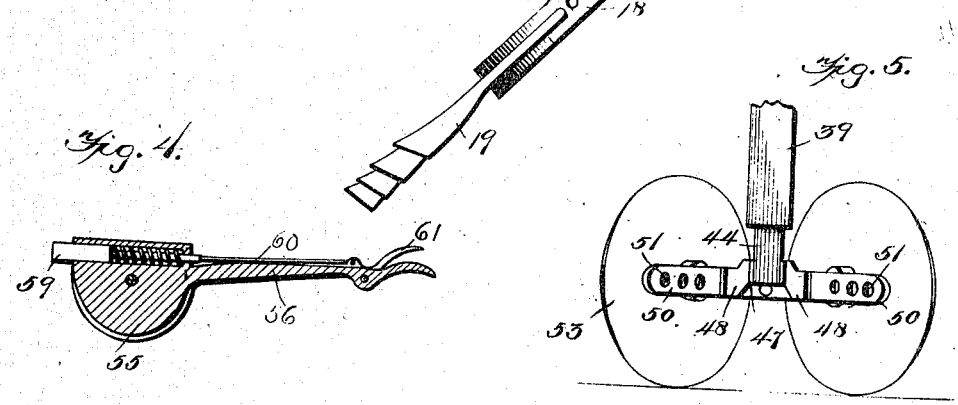
Witnesses
Inventor
Aaron L. Hockett
By L. Deane & Son
Attorneys No. 680,976. Patented Aug. 20, 1901.
A. L. HOCKETT.
COTTON CHOPPER.
(Application filed Dec. 14, 1899.)
(No Model.) 2 Sheets—Sheet 2.

Witnesses
Inventor
Aaron L. Hockett
By L. Deane & Son
Attorneys

United States Patent Office.

AARON L. HOCKETT, OF MASTODON, MISSISSIPPI.

COTTON-CHOPPER.

SPECIFICATION forming part of Letters Patent No. 680,976, dated August 20, 1901.

Application filed December 14, 1899. Serial No. 740,278. (No model.)

*To all whom it may concern:*

Be it known that I, AARON L. HOCKETT, a citizen of the United States, residing at Mastodon, in the county of Panola and State of Mississippi, have invented certain new and useful Improvements in Cotton-Choppers, of which the following is a specification, reference being had therein to the accompanying drawings.

My invention relates to a cotton-chopper, and more particularly to improved scraper attachments for this class of machines, said attachments being designed to scrape away the earth on opposite sides of a row.

The invention also includes improved details in the construction of the frame and general structure of the machine.

The present invention is an improvement on the machine described and claimed in another application for United States Letters Patent filed by me of even date herewith, Serial No. 740,277; and the novel features of the present invention will be fully described hereinafter and defined in the appended claims.

Figure 2:
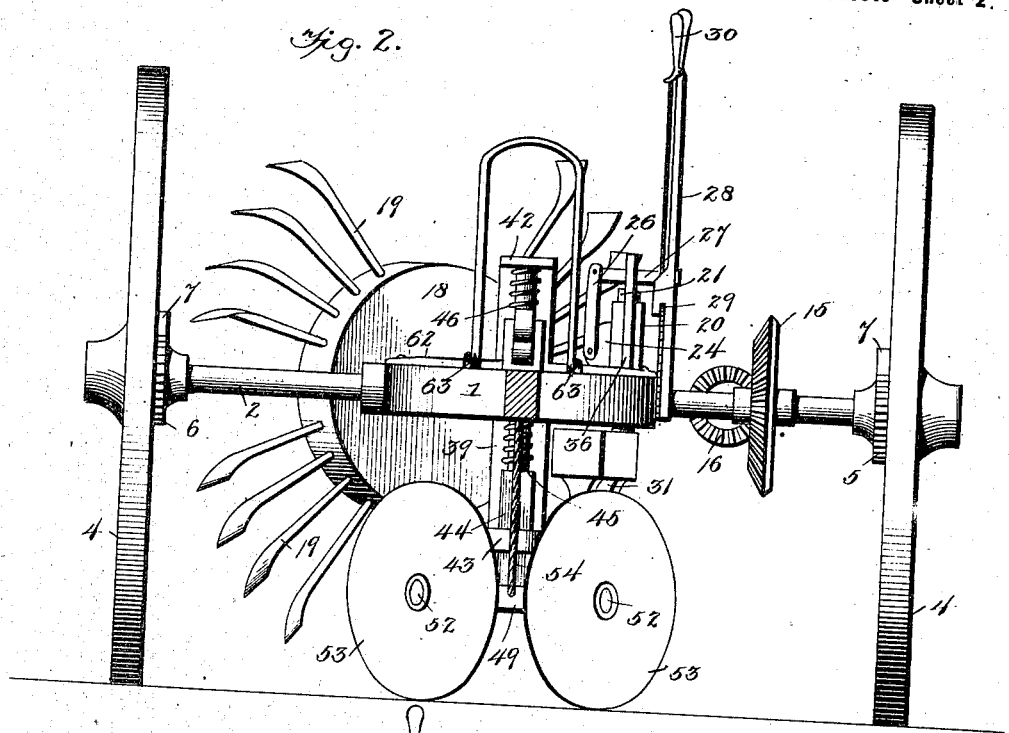
Figure 3:
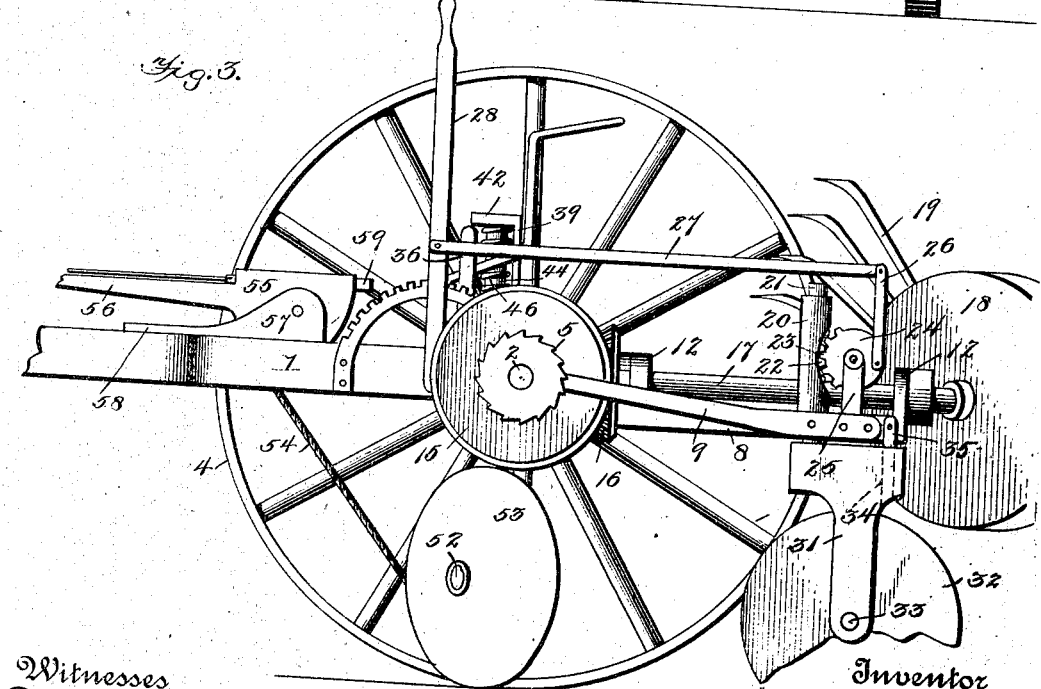

In the accompanying drawings, Figure 1 is a plan view of the machine. Fig. 2 is a front elevation thereof. Fig. 3 is a side view with one of the carrying-wheels removed, and Figs. 4 and 5 are detail views of the scrapers and their operating means.

The reference-numeral 1 designates a yoke constituting the main frame of the machine and provided at its rear ends with bearings for an axle 2, upon which are loosely mounted carrying and driving wheels 4.

The numerals 5 and 6 designate ratchet-wheels fixed upon the axle 2, one adjacent to and concentric with each of the wheels 4, which latter are each provided with a spring-pressed pawl 7, adapted to engage the ratchet-wheels to cause the axle to revolve with the wheels or to be disengaged from the ratchets when it is desired to move the machine without operating the chopping mechanism.

8 designates a frame for supporting the chopping-wheel shaft and comprising a block or body portion of wood and metal arms or straps 9 and 10 for securing the frame 8 to the axle at an angle to the latter. The arm 9 is curved, as shown, and the forward ends of both arms 9 and 10 are formed with openings, through which extends the axle 2.

Upon the frame 8, which is grooved or hollowed out on its upper surface, are arranged semicircular bearings 11, provided with annular bearing flanges or rings 12. The short arm 10 of the frame rests within and normally in contact with the adjacent side of the yoke 1. Upon the axle 2 is arranged a coil-spring 13, one end of which bears against a collar 14, fixed to the axle, and the other end against the arm 10 to hold the latter against the yoke 1. Upon the axle 2, between the arms 9 and 10, is secured a bevel gear-wheel 15, which meshes with a bevel gear-pinion 16, mounted upon the front end of a shaft 17, which is revolubly supported within the bearings 11 of the frame 8. Upon the rear end of this shaft 17 is mounted the chopping-wheel, which comprises a hub 18 and radially-projecting hoes or chopping-blades 19, arranged in groups, the spaces between the groups being determined by the character of the work.

At one side of the frame 8 and secured thereto by the arm 9 is a sleeve 20, having a longitudinal slot at its rear side. Within this sleeve is loosely supported a vertical shaft 21, formed at its rear side with a series of depressions 22 to receive teeth 23, projecting from a cam 24, pivotally secured to a bracket 25, projecting from the frame 8 and having a lever-arm 26, connected by a rod 27 with a lever 28, fulcrumed upon the yoke-frame 1, and having a pawl 29 and finger-piece 30, coöperating with a ratchet-segment secured to the main frame. The shaft 21 projects from a bracket 31, having parallel ears, between which is mounted a feed-wheel 32 upon a shaft 33. The rear end of the bracket 31 is formed with a loop or eye 34, into which projects a guide-pin 35, depending from the frame 8 and serving to guide the bracket 31 in its vertical movement.

36 designates a lever fulcrumed upon the inner side of the frame 1 and provided at its lower end with a cam 37, which is adapted to come in contact with the arm 10 of the frame 8 to force said arm inward against the tension of the spring 13, and thus move the bevel gear-pinion 16 out of gear with the gear-wheel 15. The arm 10 is flared at the point 38 to facilitate the operation of the cam-lever 36.

The construction thus far described, with the exception of the details of the frame 8, is substantially like that disclosed in my prior application for patent above referred to and the operation is of course the same; but the features now to be described are not disclosed in the said prior application and constitute the main feature of the present invention.

39 designates a frame suspended from the axle 2 by means of a bearing 40, through which the axle passes, and held against lateral play by the collars 14 and 41. This frame 39 is provided with parallel perforated ears 42 and 43, within which is guided a vertically-adjustable plunger-bar 44, formed with a shoulder 45, and surrounded at its upper portion by a coil-spring 46, which bears against the ear 42 at one end and the shoulder 45 at its opposite end. To the lower end of the bar 44 is secured a bracket 47, having rearwardly-diverging arms 48, to which is adjustably secured a bar 49, bent centrally to form diverging arms 50, each of which is formed with a series of holes 51 to receive a spindle 52 of a scraper-wheel 53. The two wheels 53, as shown, rest at an angle to each other and are adapted to operate on opposite sides of a row of cotton. The holes in the arms 50 permit the scraper-wheels to be adjusted toward or from each other. At the bent or angle point of the bar 49 is attached one end of a cord or chain 54, the opposite end of which passes around and is secured to a cam 55, provided with a lever 56. The cam is pivoted between ears 57, projecting from a bracket 58, secured to the center of the yoke 1, and the cam is recessed to receive a spring-pressed slide 59, connected by a wire 60 with a finger-piece 61, fulcrumed in the handle of the lever 56. By throwing the lever 56 rearward the scraper-wheels are elevated out of working position and are locked in this position by the engagement of the end of the slide 59 with the center of the bracket 58.

The sides of the yoke 1 are connected by a cross-bar 62, which supports a spring-seat consisting of a single piece of wire bent to form loops 63, through which the cross-bar 62 passes, and having its ends 64 bent forward to engage below the yoke 1, as shown.

The operation of the machine will be readily understood. The inclined oppositely-disposed wheels 53 scrape the earth and shape the row ahead of the chopper, which thins the cotton into hills, as is well understood in this art.

I claim—

1. In a cotton-chopper, the combination with a rotary chopping-wheel set at an inclination or obliquely to the line of draft, and a pair of reversely-disposed rotary scrapers arranged in front of the chopping-wheel and set at forwardly-convergent angles, substantially as described.

2. In a cotton-chopper, the combination of a rotary chopping-wheel set obliquely to the line of draft, a pair of reversely-disposed rotary scrapers arranged in front of the chopping-wheel and set at forwardly-convergent angles, and a vertically and laterally adjustable support for said wheels, substantially as described.

In testimony whereof I affix my signature in presence of two witnesses.

AARON L. HOCKETT.

Witnesses:
W. H. WALL,
W. D. WALL.